May 23, 1950     W. M. HOFFSOMMER     2,508,459
TOOL CHUCK
Filed Aug. 31, 1948
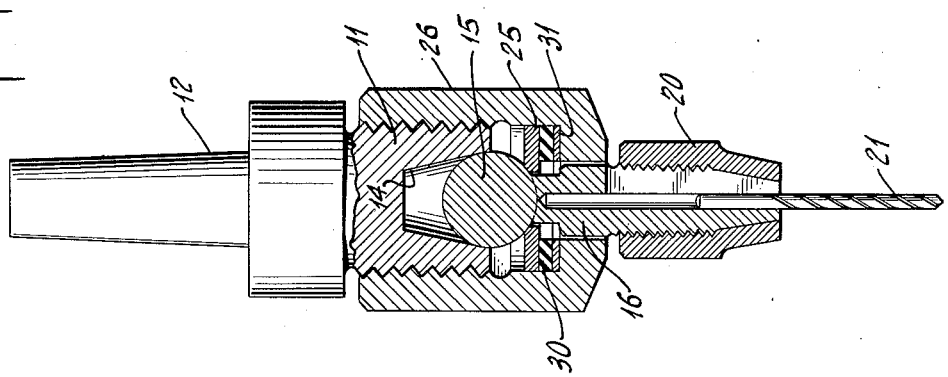
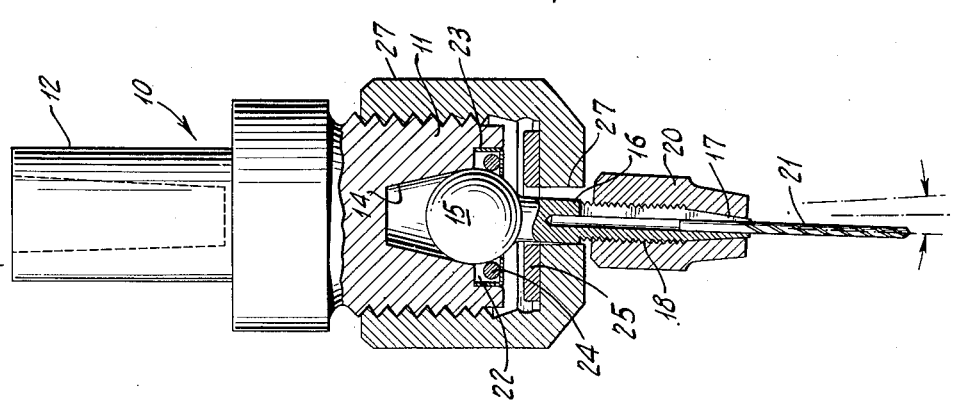
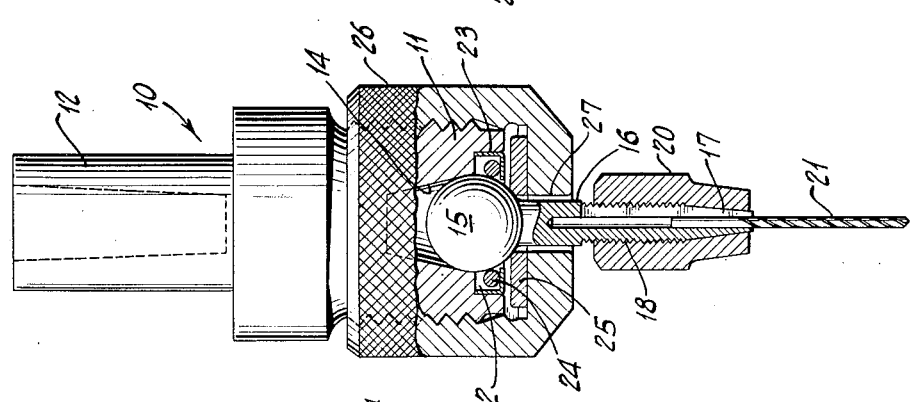
INVENTOR
WALTER M. HOFFSOMMER
BY
Duell and Kane
ATTORNEY Patented May 23, 1950

2,508,459

UNITED STATES PATENT OFFICE 2,508,459

TOOL CHUCK

Walter M. Hoffsommer, Bayside, N. Y., assignor to Bayside Watch Tool Company, Inc., Bayside, N. Y., a corporation of New York Application August 31, 1948, Serial No. 47,029

4 Claims. (Cl. 279—16)

This invention relates to an improved chuck for drills, reamers, taps and the like, and particularly to a chuck having improved means for centering the point of the tool relative to the spindle or axis of the machine with which the tool is used.

Although chucks embodying the present invention may be made in sizes to accommodate tools of usual machine shop sizes, the invention is particularly useful for the small diameter tools used in fine machine work and watchmaking, inasmuch as delicate tools of this type frequently become bent and the points or working portions thereof not concentric with the axis; the end of the tool will describe a small diameter circle in operation, and the tool will break during use or will produce defective work.

A tool chuck embodying my invention includes means whereby the chuck itself is carried by a ball and socket mounting in the body of the device—that is, the portion of the assembly mounted on the drill press spindle, for example—so that by relaxing a collar or locknut and operating the drill press, the tool may be centered by simply running a pin or other guiding means along the tool to the end thereof while the tool is rotating. The pressure of the guiding means on the side of the tool will cause the ball to shift within the socket and the tool point will be coaxial with the spindle of the drill press. Then, the clamping collar may be made home and the tool operated normally.

A feature of my invention, not found in any tool chuck of which I am aware, is the provision of means for resiliently holding the chuck jaw structure firmly within the body, even when the clamping collar is loosened, so that the chuck jaw and therein held tool will rotate with the drill press, and will not return to its original misalignment, or assume a new one, before the clamping collar is made up.

It is an object of the invention, therefore, to provide an improved tool chuck by means of which the point or working portions of a tool may be made absolutely coaxial with the spindle or the like of the machine with which the tool is used.

Other features and advantages will hereinafter appear.

In the accompanying drawings:

Fig. 1 is an elevation, partly in section, of one embodiment of the invention, showing the tool chuck in centered position and the clamping collar in home position;

Fig. 2 is a view similar to Fig. 1 but showing the clamping collar relaxed to permit an angular displacement of the chuck and the therein contained tool;

Fig. 3 is a perspective view of a spring collar for frictionally retaining the chuck in adjusted position while the securement collar is relaxed; and Fig. 4 is a side elevation, in section, of a second embodiment, the tool contained therein being in centered position.

In the accompanying drawings 10 represents one embodiment of my improved tool chuck, in which an externally threaded body 11 has a barrel or sleeve 12 for attachment to the spindle or mandrel of a drill press, tapping machine, lathe, or other machine. The body 11 is provided with a preferably conical seat 14 to receive a spherical head 15 formed with or affixed to the shank 16 of a chuck 17. The chuck itself has been conventionally represented because per se, it is incidental to the invention; the illustrated chuck shows the tapered end, threaded barrel 18 with which cooperates a compression collar 20 which serves to clamp the jaws about the shank of the tool 21.

The seat 14 is precisely concentric with sleeve 12, so as to be concentric or coaxial with the spindle or mandrel of the machine to which the device is affixed.

It is to be understood that although the tool 21 has been illustrated as a twist drill, the representation is merely typical of any tool such as a reamer, tap or lapping tool in which the working end must be concentric with the center of rotation of the tool or the work being operated on.

The body 11 is concentrically counterbored to provide a pocket 22 the base of which is preferably slightly beneath the equator of the head 15 (as viewed in Fig. 1). Within this pocket 22 is a cup-like retainer 23 containing a spring member 24. The said spring member, see Fig. 3, is preferably a split ring. The retainer 23 is tightly—preferably press-fitted—seated in the pocket 22. As shown in Fig. 1, the spring member 24 engages the head 15 well beneath the equator, and the relaxed diameter of the spring is smaller than that of the head 15 at the latitude of engagement with the spring. Hence, since the cup 23 is tightly held within the pocket 22, the reaction of the spring 24 urges the spherical head 15 upwardly into frictional contact with the wall of the conical seat 14.

A washer 25, preferably having a chamfered inner wall for enlarged area engagement with the head 15, rests upon the base of a screw threaded collar 26. The washer 25 drives the head into a tightly seated relationship within seat 14 when the collar 26 is made home, and it is the cooperation of the collar and the washer 25 which secures the chuck in its ultimate position.

As is shown in Figs. 1 and 2, the opening 27 through the base wall of the collar 26 permits a measure of angular displacement of the shank 16 of the chuck. When the collar 26 is partially unscrewed so that the washer 25 has disengaged from or is in non-confining relationship with the spherical head 15 the resilient pressure exerted by the spring 24 retains the head 15 in its conical seat, although permitting the relatively easy angular displacement of the chuck, as indicated in Fig. 2. The importance of the frictional retention of the member 15 in the seat 14 will be appreciated when it is recognized that the drill or other tool is centered by relaxing the collar 26 then operating the drill press to rotate the drill; then by means of a smooth rod, pin, or the like, drawn by the mechanic along the length of the drill while the same is rotating, the drill chuck will adjust in its seat until the point of the drill is concentric with the drill spindle. The mechanic then stops the drill press and tightens the collar 26. If the chuck were hanging free, that is, if the head 15 had been permitted to leave the seat 14, the chuck jaw might not rotate with the body, or centrifugal forces, or the force of gravity, might throw the tool again out of center before the collar 26 could be made fast.

In the embodiment of Fig. 4, in which elements corresponding to those of Fig. 1 have been similarly numbered, there is employed a resilient washer 30 preferably disposed within the collar 26 beneath the clamping washer 25. Any bearing washers 31 may be utilized to reduce the rubbing friction at the washer 30 as the collar is made up. So long as collar 26 is not relaxed beyond the limits of expansion of the washer 30, the reaction thereof will cause washer 25 to urge the head 15 into frictional association with the wall of seat 14.

Although the invention has been described by making a fully detailed reference to a certain presently preferred embodiment, such detail of description is to be understood in an instructive rather than a limiting sense, many changes being possible within the scope of the claims hereto annexed.

I claim:

1. A tool chuck, comprising a body having means of attachment to a machine element, said body having, at the end opposite said attachment means, a conical seat coaxial with said attachment means; a jaw member for receiving and securing a tool; a shank extending coaxially from said jaw member, said shank having a spherical head portion seatable within said conical seat; resilient means for urging said spherical head portion into frictional engagement with the wall of said conical seat to restrain free rotative movement of said spherical head and therewith associated shank; a collar member disposed about said body and axially movable relative thereto, said collar member having a concentric opening larger in diameter than the diameter of said shank to permit the passage of the shank therethrough; and means within said collar member and engageable with the surface of said spherical head for clamping said head tightly in seated position as said collar member is made home on said body.

2. A tool chuck, comprising a body having means of attachment to a machine element, said body having at the end opposite said attachment, a conical seat coaxial with the attachment means; a jaw member for receiving and securing a tool; a shank extending coaxially from said jaw member, said shank having a spherical head seatable within said conical seat; resilient means disposed in fixed relation with respect to said body and engageable with the surface of said spherical head for urging the same into frictional contact with the wall of said seat to restrain free rotation of said head and therewith associated shank member; a collar disposed about said body and movable axially thereof, said collar having a coaxial opening to accommodate said shank, the diameter of said opening permitting angular movement of said shank relative to said collar; a bearing surface within said collar and encircling said shank for pressure contact with the surface of said spherical head as the collar is moved axially with respect to said body member; and means for securing said collar with respect to said body to maintain the pressure exerted on said spherical element.

3. A tool chuck, comprising a body having a barrel extending coaxially therefrom to afford means for attachment to a machine element, said body being externally threaded and having an opening coaxial therewith, said opening being characterized by uniformly convergent side walls; a jaw member for receiving and securing a tool; a shank extending from said jaw member; a hardened member affixed to the end of said shank, said member having a spherical surface tangentially engageable with the walls of said opening in ball-and-socket relationship therewith; means comprising an elastic body for resiliently maintaining said hardened member in seated position on the walls of said opening; a collar disposed about said body and said shank, said collar being threaded cooperatively with said body; and a bearing member disposed within said collar and engageable with the spherical surface portion of said shank-affixed member as said collar is secured home on said body to immovably clamp said member against the walls of said body opening.

4. A tool chuck, comprising a body having a barrel extending coaxially therefrom to afford means for attachment to a machine element, said body being externally threaded and having an opening coaxial therewith, said opening being characterized by uniformly convergent side walls; a jaw member for receiving and securing a tool; a shank extending from said jaw member; a hardened member affixed to the end of said shank, said member having a spherical surface tangentially engageable with the walls of said opening in ball-and-socket relationship therewith; means comprising a split ring of spring material maintained in tangential contact with the spherical surface for resiliently maintaining said hardened member in seated position on the walls of said opening; a collar disposed about said body and said shank, said collar being threaded cooperatively with said body; and a bearing member disposed within said collar and engageable with the spherical surface portion of said shank-affixed member as said collar is secured home on said body to immovably clamp said member against the walls of said body opening.

WALTER M. HOFFSOMMER.

REFERENCES CITED

The following references are of record in the file of this patent:

UNITED STATES PATENTS

| Number | Name | Date |
|---|---|---|
| 460,601 | Skinner | Oct. 6, 1891 |
| 821,651 | Landgraf | May 29, 1906 |
| 1,101,601 | Wendt | June 30, 1914 |
| 1,109,625 | Cooper | Sept. 1, 1914 |
| 1,702,810 | Buhn | Feb. 19, 1929 |
| 2,381,102 | Boyd | Aug. 7, 1945 |